United States Patent Office 3,592,758
Patented July 13, 1971

3,592,758
HYDROGENATION OF AROMATIC
HYDROCARBONS
Texas V. Inwood, La Habra, Calif., assignor to Union Oil
Company of California, Los Angeles, Calif.
No Drawing. Filed Feb. 5, 1969, Ser. No. 796,895
Int. Cl. C10g 23/04
U.S. Cl. 208—89                  10 Claims

ABSTRACT OF THE DISCLOSURE

Aromatic hydrocarbon feedstocks containing organic sulfur compounds are hydrogenated in a "single-stage" process, utilizing a dual-catalyst hydrogenation system. The feed is first hydrofined over a sulfactive catalyst selective for the hydrodecomposition of organic sulfur compounds, and total effluent is then hydrogenated over a sulfur-sensitive Group VIII noble metal hydrogenation catalyst active for the hydrogenation of aromatic hydrocarbons.

BACKGROUND AND SUMMARY OF INVENTION

It is well known that Group VIII noble metal catalysts, e.g. platinum-alumina, are very active for the hydrogenation of aromatic hydrocarbons, but that their activity is easily poisoned by sulfur compounds. When it is desired to hydrogenate sulfur-containing feedstocks over Group VIII noble metal catalysts, it has therefore become conventional procedure to pretreat such feeds for sulfur removal. The most commonly employed pretreatment is catalytic hydrofining, wherein the feed is subjected to hydrogenating conditions in the presence of a sulfactive hydrofining catalyst such as cobalt-molybdenum-alumina compositions, whereby the organic sulfur is converted to hydrogen sulfide. These hydrofining catalysts display relatively poor activity for the hydrogenation of aromatic hydrocarbons, especially monocyclic aromatics.

It has generally been assumed, when hydrogenating sulfur-containing feeds, that the active poisoning agent for the noble metal hydrogenation catalysts consists mainly of hydrogen sulfide, which is generated under hydrogenating conditions from the organic sulfur compounds in the feed. It has been hypothesized that the hydrogen sulfide converts at least the surface of the noble metal to sulfided species which are less active for the hydrogenation of aromatic hydrocarbons. Under this hypothesis, it might be assumed that organic sulfur compounds which combine less readily within the noble metal, and which are relatively difficulty decomposed under hydrogenating conditions, e.g. thiophene, would exert a lesser poisoning effect than would hydrogen sulfide, or other sulfur compounds which are easily decomposable to hydrogen sulfide. I have now discovered that these hypotheses appear to be incorrect, and that the more refractory organic sulfur compounds exhibit a greater deactivating effect on noble metal catalysts than does hydrogen sulfide or easily decomposable organic sulfur compounds. This discovery has led to the present invention, which effects a considerable economy in the hydrogenation of certain aromatic feedstocks which contain moderate amounts of organic sulfur compounds.

Under the previous hypothesis that hydrogen sulfide was the most potent of the sulfurous catalyst poisons, it was considered mandatory in all cases where a feedstock contains sufficient organic sulfur to require prehydrofining, to remove the hydrogen sulfide generated during hydrofining prior to contacting the purified feedstock with the noble metal catalyst. This has always resulted in a full "two-stage" process, with intervening cooling and condensation of the hydrofiner effluent, recycle of separated hydrogen to the hydrofiner, caustic and/or water-washing of the condensate, and reheating of the washed condensate feed to the hydrogenation zone, for which a separate hydrogen recycle system must be maintained. The need for two separate heat exchangers for product condensation, two separate recycle gas compressors, as well as the interstage washing facilities, and the attendant increased utility requirements, adds greatly to the expense of such a two-stage system, as compared to a single-stage system involving the same total catalyst volume.

Moreover, the two-stage system in all cases requires two separate reactors, whereas in a single stage process it is often more economical to employ a single reactor enclosing both the hydrofining and the hydrogenation catalyst beds. In my process, the hydrofining and hydrogenation catalysts may be disposed in the same reactor or separate reactors as desired (an economic factor which depends mainly on plant size), and the entire process can be operated with a single heat exchange system for product condensation, and with a single recycle gas system. These economies are found in many cases to far offset the cost of the slightly larger volume of hydrogenation catalyst required to compensate for the poisoning effect of the hydrogen sulfide which is allowed to pass therethrough.

From the foregoing, it will be apparent that my unexpected discovery of the difference in poisoning effect as between $H_2S$ and organic sulfur enables the refiner to effect substantial economies in the hydrogenation of a certain class of feedstocks, i.e. those feeds which contain sufficient sulfur to warrant a prehydrofining step, but insufficient to warrant the expense of a full two-stage process. Obviously, for feeds containing very minimal amounts of sulfur, it may be economically preferable to increase the size of the hydrogenator slightly and dispense entirely with the prehydrofiner. And in the case of feeds containing very large amounts of sulfur, two-staging the process for intervening $H_2S$ removal may be desirable because the required capital and utility expenses would be less than the incremental costs of the much larger hydrogenation reactor and catalyst volumes required to maintain conversion at very high $H_2S$ levels.

However, it is within the scope of my invention to practice the present single-stage process even with feedstocks which under present economic conditions could be more economically processed without prehydrofining, or in the conventional two-stage system. Although, under present economic conditions, my process is particularly economical for the hydrogenation of feedstocks containing between about 5 and 500 p.p.m. of organic sulfur in the form of $C_4+$ compounds, these values could change drastically with advancing technology, as for example the discovery of more efficient hydrofining catalysts (which might reduce the 5 p.p.m. figure to 1 p.p.m. for example), or the discovery of cheaper and more effective noble metal hydrogenation catalysts (which might raise the 500 p.p.m. figure to 5,000 p.p.m. for example). With any feedstock containing undesirable amounts of sulfur, there is some advantage to be gained in the utilization of my dual-catalyst, single-stage system, as compared to the noble metal single-catalyst system, where under prior art premises no such advantage would be expected.

Surprisingly, I have found that the organic sulfur compounds which exert the strongest poisoning effect upon the noble metal hydrogenation catalysts are those which are incapable of chemically combining with the bulk noble metal, i.e. organic sulfides, and particularly cyclic sulfides such as thiophene. Mercaptans appear to be intermediate in their poisoning effect between hydrogen sulfide and organic sulfides, although the lower mercaptans, methyl and ethyl mercaptan, are substantially equivalent to hydrogen sulfide in this respect. The term "sulfide" is employed herein to designate any sulfhydrocarbon containing sulfur bonded exclusively to carbon atoms. My invention is particularly advantageous for the hydrogenation of feedstocks containing sulfide sulfur in amounts ranging between about 5 and 300 p.p.m.

DETAILED DESCRIPTION

(A) Feedstocks

Feedstocks contemplated herein include any desired aromatic hydrocarbon or mixtures thereof, including benzene, toluene, xylenes, naphthalene, gasoline, solvent naphthas, kerosene, turbine fuels, diesel fuels, gas oils, catalytic cracking cycle oils, lubricating oils, or any desired fraction of such products. The aromatic content will ordinarily, though not necessarily, be greater than about 10 volume-percent, and it is further preferred that the feed contain at least about 5 volume-percent of monocyclic aromatic hydrocarbons. As indicated above, the process is of greatest advantage in connection with feedstocks containing between about 5 and 300 p.p.m. (preferably between 10 and 150 p.p.m.) of sulfide sulfur. Nitrogen content of the feed should preferably be below about 10 p.p.m. The feedstock may be derived from any desired source, e.g. petroleum crude oils, shale oils, tar sand oils, coal hydrogenation products and the like.

(B) Hydrofining conditions and catalysts

The hydrofining conditions and catalysts for the first stage of my process may be substantially conventional. Suitable catalysts may comprise any of the oxides and/or sulfides of the transitional metals, and especially an oxide or sulfide of a Group VIII metal (particularly cobalt or nickel) mixed with an oxide or sulfide of a Group VI–B metal (preferably molybdenum and/or tungsten). Such catalysts are preferably supported on an adsorbent carrier in proportions ranging between about 2 percent and 25 percent by weight. Suitable carriers include in general the difficultly reducible inorganic oxides, e.g., alumina, silica, zirconia, titania, clays such as bauxite, bentonite, etc. Preferably the carrier should display little or no cracking activity, and hence highly acidic carriers having a Cat-A cracking index of above about 25 should be avoided. The preferred carrier is activated alumina, and especially activated alumina containing about 3–15 percent by weight of coprecipitated silica gel.

The preferred hydrofining catalyst consists of a sulfided composite of nickel and molybdenum supported on silica-stabilized alumina. Compositions containing between about 1 percent and 8 percent of Ni, 3 percent and 25 percent of Mo, 3 percent and 15 percent of $SiO_2$, and the balance alumina, and wherein the atomic ratio of Ni/Mo is between about 0.2 and 4 are especially preferred.

Suitable hydrofining conditions may be summarized as follows:

HYDROFINING CONDITIONS

|  | Operative | Preferred |
|---|---|---|
| Average bed temperature, °F | 550–850 | 650–800 |
| Pressure, p.s.i.g. | 150–3,500 | 400–1,500 |
| LHSV | 0.2–20 | 0.5–5 |
| $H_2$/oil ratio, M. s.c.f./b. | 0.5–20 | 2–12 |

Those skilled in the art will understand that these conditions should be suitably selected and correlated to effect the desired degree of desulfurization, which conditions will depend largely upon the nature of the feedstock. Normally it is desired to reduce the organic sulfur level of the feed to below about 10, and preferably below about 5 p.p.m.

(C) Hydrogenation conditions and catalysts

Hydrogenation in the second stage of my process may likewise be carried out under substantially conventional conditions, using conventional noble metal catalysts. The preferred metals are platinum and palladium, but rhodium, ruthenium, iridium and osmium may be used to less advantage. Mixtures of any two or more of such metals are also contemplated. The metal or metals are preferably supported, as by impregnation, on substantially non-cracking adsorbent carriers of the same nature as described above in connection with hydrofining catalysts. The proportion of noble metal normally ranges between about 0.1 and 3 percent, preferably between 0.2 and 1.5 percent by weight. Preferred catalysts comprise about 0.2–1 percent by weight of platinum or palladium supported on activated gamma alumina, or eta alumina. Platinum-alumina catalysts conventionally used for the reforming of naphtha fractions may also be utilized.

The hydrogenation may be carried out under conditions summarized generally as follows:

HYDROGENATION CONDITIONS

|  | Operative | Preferred |
|---|---|---|
| Temperature, °F | 300–800 | 350–700 |
| Pressure, p.s.i.g. | 300–4,000 | 400–2,000 |
| LHSV | 0.2–20 | 1–15 |
| $H_2$/oil ratio, M. s.c.f./b. | 0.5–20 | 2–12 |

As will be understood by those skilled in the art, the above conditions should be selected and correlated with the catalyst and the feed to achieve the desired degree of hydrogenation. Normally it is desired to effect at least about 80 percent hydrogenation of the aromatic hydrocarbons, but in many cases, as in the case of jet fuels and diesel fuels, a lesser degree of hydrogenation may be desired in order to minimize hydrogen consumption.

The effluent from the hydrogenation zone is then cooled and condensed at e.g. 50–200° F. to recover the hydrogenated liquid product and a hydrogen-rich recycle gas which is normally recycled to the hydrofining zone, although a portion thereof may be recycled to the hydrogenation zone if desired. Fresh makeup hydrogen may be supplied to either or both stages of the process. In the case of high-sulfur feedstocks, it may be desirable to scrub all or a portion of the recycle gas was caustic or Girbotol solvent to remove $H_2S$, and thus prevent the buildup thereof in the system.

(D) Process modifications

While it is essential to the practice of my invention that at least some of the hydrogen sulfide and hydrocarbon effluent from the hydrofining stage be passed through the hydrogenation zone, it is not essential that the entire hydrofiner effluent be so treated. In some cases, e.g. in the treatment of heavy feedstocks, the hydrofiner effluent may comprise a liquid phase and a vapor phase, and it may be desired to withdraw a portion of the liquid phase for other uses. Also, in the case of very high sulfur feedstocks, it may be desirable to remove a portion of the hydrogen sulfide generated in the hydrofiner, as by oil absorption, or adsorption on solid adsorbents, or by other methods not requiring a full two-staging of the process. The essential feature of my invention simply involves maintaining a single-stage operation, with at least a substantial portion of the hydrogen sulfide and hydrocarbon effluent from the hydrofiner passing through the hydrogenation zone.

In one contemplated modification, instead of a single hydrofiner, two separate hydrofiners may be employed in alternating sequence in order to provide for continuous operation where the hydrofining catalyst requires regeneration more frequently than the hydrogenation catalyst. Other modifications will be apparent to those skilled in the art.

The following examples are cited to illustrate the invention more specifically, but are not to be construed as limiting in scope:

EXAMPLE I

A previously hydrofined naphtha reformer feedstock was hydrogenated at 550° F., 600 p.s.i.g., 8.0 LHSV with 4000 s.c.f. of hydrogen per barrel of feed, over a commercial reforming catalyst consisting of 0.5 weight-percent Pt supported on a mixed eta-gamma alumina carrier in the form of 1/16″ extrudate. The principal feedstock characteristics were:

| | |
|---|---|
| Gravity, ° API | 54.2 |
| Boiling range (D–86), ° F.: | |
| IBP | 207 |
| 10% | 232 |
| 50% | 273 |
| 90% | 339 |
| Max | 377 |
| Sulfur, p.p.m.: | |
| Non-mercaptan | 1.7 |
| Mercaptan [1] | 8.3 |
| Nitrogen, p.p.m. | <1 |
| Volume-percent: | |
| Aromatics | 13.4 |
| Naphthenes | 41.6 |
| Paraffins | 45.1 |

[1] Added as ethyl mercaptan.

The ethyl mercaptan was added to simulate the effect of an equivalent amount of $H_2S$ carried over from the hydrofiner, the lower mercaptans having previously been found to be substantially equivalent to $H_2S$ in their poisoning effect on $Pt\text{-}Al_2O_3$ catalysts. The hydrogenated product was found to contain 0.3 volume percent aromatics, corresponding to 98% conversion. The first order reaction rate constant, based on the equation:

$$K = LHSV \ln\left(\frac{A_f}{A_p}\right)$$

(where $A_f$ is the aromatic content of the feed and $A_p$ the aromatic content of the product) was calculated to be 30.5.

EXAMPLE II

Another naphtha feedstock which had not been prehydrofined, and which contained organic sulfides and mercaptans mainly in the $C_6$–$C_{12}$ range, was hydrogenated over the same catalyst and under the same conditions as in Example I. The feed characteristics were as follows:

| | |
|---|---|
| Gravity, ° API | 44.9 |
| Boiling range, ° F.: | |
| IBP | 176 |
| 10% | 243 |
| 50% | 304 |
| 90% | 364 |
| Max | 418 |
| Sulfur, p.p.m.: | |
| Non-mercaptan | 3 |
| Mercaptan | 10 |
| Nitrogen, p.p.m. | <1 |
| Volume-percent: | |
| Aromatics | 35.9 |
| Saturates | 64.1 |

The hydrogenated product was found to contain 2.8 volume-percent aromatics, corresponding to only 92% conversion. The first order rate constant was calculated to be 20.4. Thus, about 50% more catalyst is required to obtain the same conversion of the feed of this example than for the feed of Example I. To rule out the possibility that this difference might be due entirely to the slightly higher boiling range of this feed, or its slightly higher total sulfur content, the following experiments were carried out:

EXAMPLE III

The feed of Example I was doped with ethyl mercaptan to a total sulfur content of 23 p.p.m., and hydrogenated over the same catalyst at 500° F., 600 p.s.i.g., 8.0 LHSV and 4000 s.c.f. $H_2$/b. Over 113 hours of operation, the product aromatic content averaged 1.3 volume-percent, corresponding to 90.5% conversion. The first order rate constant was calculated to be 18.5.

EXAMPLE IV

The feed of Example I was doped with 3-methylthiophene to a total sulfur content of 26 p.p.m., and hydrogenated over the same catalyst and under the same conditions as in Example III. The product aromatic content was 7.6 volume-percent, corresponding to only 43% conversion. The first order rate constant was calculated to be 4.57. Thus, over four times more catalyst is required to obtain the same conversion of the thiophene-doped feed of this example than would be required for the ethyl mercaptan-doped feed of Example III, even though the overall sulfur content of the two feeds is substantially the same. It is thus clear that by prehydrofining a feed containing organic sulfides to convert the same to hydrogen sulfide, the resulting total effluent can be hydrogenated over noble metal catalysts much more efficiently than could the raw feed.

It is not intended that the invention should be limited to the details described above, since many variations may be made by those skilled in the art without departing from the scope or spirit of the following claims.

I claim:
1. A process for the hydrogenation of aromatic hydrocarbons in a hydrocarbon feedstock contaminated with organic sulfur compounds, which comprises:
   (1) subjecting said feedstock plus added hydrogen to catalytic hydrofining at an elevated temperature and pressure in contact with a sulfactive hydrofining catalyst comprising a Group VI–B metal or sulfide thereof, to effect hydrodecomposition of at least a portion of said organic sulfur compounds with resultant productiono f hydrogen sulfide;
   (2) subjecting effluent from step (1), comprising hydrogen, hydrogen sulfide and hydrocarbon feedstock, to catalytic hydrogenation at a temperature between about 350° and 700° F. and a pressure above 300 p.s.i.g. in contact with a sulfur-sensitive catalyst comprising a Group VIII noble metal supported on a porous support having a Cat-A cracking index below about 25, to effect hydrogenation of aromatic hydrocarbons in said feedstock;
   (3) separating effluent from step (2) into a hydrogenated hydrocarbon product and a hydrogen-rich recycle gas; and
   (4) recycling at least a substantial portion of said hydrogen-rich recycle gas to step (1).

2. A process as defined in claim 1 wherein said hydrofining catalyst consists essentially of a sulfided composite of nickel and molybdenum supported on an activated alumina carrier.

3. A process as defined in claim 1 wherein said hydrogenation catalyst consists essentially of platinum or palladium supported on an alumina carrier.

4. A process as defined in claim 1 wherein said feedstock contains between about 5 and 500 p.p.m. by weight of organic sulfur.

5. A process as defined in claim 1 wherein said feedstock is a mineral oil fraction containing between about 5 and 300 p.p.m. by weight of organic sulfide sulfur.

6. A process as defined in claim 1 wherein said feedstock is a mineral oil fraction containing heterocyclic sulfur compounds.

7. A process as defined in claim 1 wherein substantially the entire effluent from step (1) is treated in step (2), without intervening separation of hydrogen sulfide.

8. A process for the hydrogenation of aromatic hydrocarbons in a mineral oil feedstock containing at least about 10 volume-percent of aromatic hydrocarbons and between about 5 and 500 p.p.m. by weight of organic sulfur, at least a portion of which is in the form of heterocyclic sulfur compounds, which comprises:
   (1) subjecting said feedstock plus added hydrogen to catalytic hydrofining at an elevated temperature and pressure in contact with a sulfactive hydrofining catalyst comprising a sulfided composite of molybdenum plus at least one of the metals, nickel and cobalt supported on an activated alumina carrier, to effect a substantially complete decomposition of said organic sulfur compounds with resultant production of hydrogen sulfide and a hydrocarbon product containing less than about 10 p.p.m. of organic sulfur;

(2) subjecting total effluent from step (1) to catalytic hydrogenation at a temperature between about 350° and 750° F. and a pressure above 300 p.s.i.g. in the presence of a sulfur-sensitive hydrogenation catalyst consisting essentially of platinum or palladium supported on an activated alumina carrier, to effect hydrogenation of aromatic hydrocarbons in said feedstock;

(3) cooling and condensing the effluent from step (2) and separating therefrom a hydrogenated mineral oil product, and a hydrogen-rich recycle gas; and (4) recycling said hydrogen-rich recycle gas to step (1).

9. A process as defined in claim 8 wherein said feedstock contains between about 5 and 300 p.p.m. by weight of organic sulfur.

10. A process as defined in claim 8 wherein said organic sulfur compounds comprise thiophene-nucleus compounds.

References Cited
UNITED STATES PATENTS

| | | | |
|---|---|---|---|
| 3,125,511 | 3/1964 | Tupman et al. | 208—264 |
| 3,132,089 | 5/1964 | Hass et al. | 208—89 |
| 3,256,178 | 6/1966 | Hass et al. | 208—89 |

DELBERT E. GANTZ, Primary Examiner

R. M. BRUSKIN, Assistant Examiner

U.S. Cl. X.R.

208—143, 217